United States Patent Office 3,784,552
Patented Jan. 8, 1974

3,784,552
METHOD FOR OBTAINING HIGH PURITY 2,3,5,6 - TETRACHLORO-4-(METHYLSULFONYL) PYRIDINE
Demetrios Kyriacou, Clayton, Calif., assignor to The Dow Chemical Company, Midland, Mich.
No Drawing. Filed July 26, 1972, Ser. No. 275,269
Int. Cl. C07d 31/48
U.S. Cl. 260—294.8 F                      7 Claims

ABSTRACT OF THE DISCLOSURE

The present disclosure is directed to a method for separating 2,3,5,6-tetrachloro-4-(methylsulfonyl)pyridine from admixture with closely related chlorine and sulfur substituted pyridines. The separation is carried out by contacting a mixture of the above pyridine compounds with sulfuric acid to precipitate the 2,3,5,6-tetrachloro-4-(methylsulfonyl)pyridine product, and recovering said product from the acid medium.

BACKGROUND OF THE INVENTION

Conventional methods for synthesis of 2,3,5,6-tetrachloro - 4 - (methylsulfonyl)pyridine, hereinafter called sulfone, yield a crude reaction product having a sulfone content of about 85 to 90 percent, along with major impurity by-products including about 2 to 5 percent each of 2,3,5,6-tetrachloro-4-(methylsulfinyl)pyridine, hereinafter called sulfoxide, and 2,3,5-trichloro-4,6-bis(methylsulfonyl)pyridine, hereinafter called bis-sulfone. Additionally, smaller amounts of 2,3,5,6 - tetrachloro - 4- ((chloromethyl)sulfonyl)pyridine, hereinafter called chloromethyl sulfone, pentachloropyridine, 2,3,5,6-tetrachloro - 4 - ((chloromethyl)sulfinyl)pyridine, hereinafter called chloromethyl sulfoxide, and unreacted 2,3,5,6-tetrachloro - 4 - (methylthio)pyridine, hereinafter called sulfide, are present in combined quantities totaling less than about 5 percent of the crude product.

Each of the above-identified pyridine compounds is a solid, each is soluble in concentrated sulfuric acid (e.g. 95–96 percent $H_2SO_4$), and with the exception of the sulfide, each liberates only a small amount of heat when dissolved in the acid. It now has unexpectedly been found, however, that while all of the above-identified compounds are readily soluble in concentrated sulfuric acid, at lower acid concentrations the solubility of the sulfone differs radically from that of each of the other compounds. Whereas, for example, only about 0.9 gram of the sulfone is soluble per 100 grams of solvent in a 70 to 85 percent sulfuric acid solution, the major impurities are from about 10 to more than 100 times as soluble in the same range of acid concentrations.

The present invention provides a method for substantially improving the purity of the desired sulfone reaction product while maintaining a high product yield. The process, moreover, is an economical method which can be practiced using conventional equipment.

SUMMARY OF THE INVENTION

The present invention relates, in general, to a method for separating 2,3,5,6-tetrachloro - 4 - (methylsulfonyl)-pyridine from admixture with 2,3,5,6-tetrachloro-4-(methylsulfinyl) pyridine,
2,3,5-trichloro-4,6-bis(methylsulfonyl)pyridine,
2,3,5,6-tetrachloro-4-((chloromethyl)sulfonyl)pyridine,
2,3,5,6-tetrachloro-4-(methylthio)pyridine,
pentachloropyridine, and
2,3,5,6-tetrachloro-4-((chloromethyl)sulfinyl)pyridine by contacting the admixture with sulfuric acid, precipitating the desired sulfone product from the sulfuric acid medium while maintaining the $H_2SO_4$ concentration at from about 70 to about 85 percent, and thereafter recovering said product from the sulfuric acid medium.

DESCRIPTION OF SOME PREFERRED EMBODIMENTS

The actual practice of the present invention usually entails dissolving directly in concentrated sulfuric acid (for example, about 95–96 percent $H_2SO_4$) a crude reaction product as hereinbefore set forth, diluting the resulting acidic mixture with water to provide an acid concentration of from about 70 to about 85 percent $H_2SO_4$ thereby effecting the precipitation of the sulfone product, and finally, recovering the solid sulfone from the residual aqueous acidic medium. The off-white solid sulfone product can, if desired, be washed and dried by conventional techniques.

The crude product admixture can be contacted directly with about 80 percent sulfuric acid until all of the impurities have dissolved, but this is a very slow process. In practice, therefore, the crude product is ordinarily dissolved in toto in the concentrated sulfuric acid before the acid is diluted to a concentration at which the sulfone precipitates as set forth hereinbefore.

Another preferred embodiment, however, permits the use of 70 to 85 percent sulfuric acid and therefore enables the acid to be recycled without it first being reconcentrated. Rather than first dissolving the crude product in the concentrated sulfuric acid as above, it can instead be dissolved in an inert liquid carrier which is non-reactive and immiscible with the acid. Representative inert solvents include the chlorinated hdyrocarbons such as, for example, dichloromethane, perchloroethylene, 1,2-dichloroethane, and carbon tetrachloride.

When employing the methods taught in this invention for more than an isolated batch of crude product, it becomes economically and ecologically desirable to recycle the sulfuric acid. If the first preferred embodiment is used, wherein the crude product is initially dissolved in concentrated sulfuric acid, it becomes necessary to reconcentrate the acid from about 80 percent to about 95 percent $H_2SO_4$. Before this is done, moreover, partial removal of the dissolved impurities from the acid, particularly the dissolved sulfoxide and bis-sulfone, may be required in order to achieve optimum results. This preliminary step can be accomplished either by further dilution of the acid or by conventional solvent extraction techniques utilizing a solvent which is non-reactive and immiscible with the acid. A representative list of such solvents is hereinbefore set forth.

If the second preferred embodiment is used, however, the sulfuric acid mixture remaining as a filtrate can be reused until saturated with impurities. Somewhat improved results can be obtained if the sulfoxide and bis-sulfone contents of the acid are kept at a low level by conventional solvent extraction methods as hereinbefore set forth.

From the solubility of the substances in the various concentrations of sulfuric acid, one skilled in the art can readily estimate the relative amount of acid required at any given concentration for the total amount of crude product to be processed. The actual amount of sulfuric acid used is not critical except that a quantity sufficient to dissolve all the impurities is required at minimum. If the first suggested embodiment is employed, the minimum quantity required is that which is sufficient to dissolve not only all the impurities, but also the sulfone. When applying the second suggested embodiment to a sample containing impurities in the range given (sulfoxide and bis-sulfone, about 2–5 percent each; chloromethyl sulfone, about 1–2 percent; and pentachloropyridine, chloromethyl sulfoxide, and unreacted sulfide totalling about 2 percent) the limits of the concentrations of sulfuric acid are 70 to 85 percent $H_2SO_4$. The weight ratio of acid solution to crude product should be from about 40 to 1 to about 4 to 1.

It is not normally desirable to use quantities of sulfuric acid far in excess of the minimum required. To do so increases costs by increasing handling, storage and pumping costs as well as the cost of the additional acid itself. Excess acid also makes recovery of the product from solution more difficult, thus reducing the product yield. Finally, the presence of excess acid compounds the safety hazards which are inherent in the use of large quantities of sulfuric acid.

The following examples serve to illustrate the practice of the present invention but are not intended to be limitations on the overall scope of the invention.

Example 1

Thirty grams of the crude product obtained from the oxidation of 2,3,5,6-tetrachloro-4-(methylthio)pyridine and containing about 85 percent pure sulfone was dissolved in 60 milliliters of concentrated (95–96 percent $H_2SO_4$) sulfuric acid. To this solution was added, slowly and with sufficient stirring to keep the temperature of the solution below about 55° C., 21 milliliters of water. Upon addition of the water which diluted the acid solution to ∼77 percent $H_2SO_4$, white crystals formed, the liquid acid turned brown and the mixture became a rather thick slurry. The slurry was filtered using suction and a fritted glass funnel of medium porosity leaving the sulfuric acid solution containing substantially all of the impurities as a filtrate. The sulfone crystals recovered from the slurry were washed with two 20 milliliter portions of water, then with 40 milliliters of a weak ammonium hydroxide solution (1 milliliter of concentrated ammonium hydroxide to 39 milliliters of water), and finally with two 40 milliliter aliquots of water. The purified sulfone product was dried in an evacuated oven at about 85° C. for 1 hour and recovered in a yield of 24 grams.

The purified product was analyzed by vapor phase chromatography and was found to consist of about 96 percent pure 2,3,5,6-tetrachloro-4-(methylsulfonyl)pyridine. Thin layer chromatography analysis of the end product revealed the presence of some 2,3,5,6-tetrachloro-4-((chloromethyl)sulfone)pyridine, but all other impurities had been effectively removed. The sulfone recovery based on initial content of the crude product was ∼90 percent.

Example 2

Ten grams of crude product obtained from the oxidation of 2,3,5,6-tetrachloro-4-(methylthio)pyridine and containing about 85 percent pure sulfone was dissolved in 25 milliliters of warm dichloromethane. To this solution was added 50 milliliters of sulfuric acid having a concentration of approximately 75 percent $H_2SO_4$. While being stirred, the two phase liquid system was warmed to 45° C. to evaporate the dichloromethane. As the dichloromethane was expelled, the sulfone crystallized, while the sulfoxide, bis-sulfone, and other impurities were taken up in the sulfuric acid phase. Recovery of the sulfone product was executed as in Example 1 and a quantitative yield was realized. Vapor phase chromatography analysis showed an end product of ∼95 percent pure sulfone.

The sulfuric acid mixture produced as a filtrate in the first run was recycled without further treatment and was used in a second run made with a new sample of crude product. Vapor phase chromatography analysis showed an end product for the second run of ∼90 percent pure sulfone. A quantitative yield of the sulfone based on initial content was again realized.

A third run was made in which the sulfuric acid filtrate from the second run was again recycled except that it first was shaken in a separatory funnel with 25 milliliters of dichloromethane to remove the bulk of the major impurities. Vapor phase chromatography analysis of the end product of run three showed ∼95 percent pure sulfone. As before, a good yield of the sulfone based on initial content was realized.

What is claimed is:

1. A method for separating 2,3,5,6-tetrachloro-4-(methylsulfonyl)pyridine from admixture with 2,3,5,6-tetrachloro-4-(methylsulfinyl)pyridine, 2,3,5-trichloro-4,6-bis(methylsulfonyl)pyridine, 2,3,5,6-tetrachloro-4-((chloromethyl)sulfonyl)pyridine, 2,3,5,6-tetrachloro-4-(methylthio)pyridine, pentachloropyridine, and 2,3,5,6-tetrachloro-4-((chloromethyl)sulfinyl)pyridine which comprises dissolving the admixture in concentrated sulfuric acid, diluting the acid solution with water to a concentration within a range from about 70 to about 85 percent $H_2SO_4$ thereby precipitating the 2,3,5,6-tetrachloro-4-(methylsulfonyl)pyridine product, and recovering the product from the acidic mixture.

2. A method for separating 2,3,5,6-tetrachloro-4-(methylsulfonyl)pyridine from admixture with 2,3,5,6-tetrachloro-4-(methylsulfinyl)pyridine, 2,3,5-trichloro-4,6-bis(methylsulfonyl)pyridine, 2,3,5,6-tetrachloro-4-((chloromethyl)sulfonyl)pyridine, 2,3,5,6-tetrachloro-4-(methylthio)pyridine, pentachloropyridine, and 2,3,5,6-tetrachloro-4-((chloromethyl)sulfinyl)pyridine which comprises dissolving the admixture in an organic solvent which is inert and immiscible in sulfuric acid, adding to this solution sulfuric acid of a concentration in a range from about 70 to about 85 percent $H_2SO_4$, agitating the mixture and removing the organic solvent thereby precipitating the 2,3,5,6-tetrachloro-4-(methylsulfonyl)pyridine product, and recovering the product from the acidic mixture.

3. The method according to claim 2 wherein the organic solvent is dichloromethane.

4. The method according to claim 2 and including the step of recycling the 70 to 85 percent sulfuric acid for use in treating additional admixture.

5. The method according to claim 4 and including the step of treating the 70 to 85 percent sulfuric acid by conventional solvent extraction techniques to remove major impurities therefrom prior to recycling.

6. The method according to claim 3 and including the step of recycling the 70 to 85 percent sulfuric acid for use in treating additional admixture.

7. The method according to claim 6 and including the step of treating the 70 to 85 percent sulfuric acid by conventional solvent extraction techniques to remove major impurities therefrom prior to recycling.

References Cited

UNITED STATES PATENTS

| 3,719,682 | 3/1973 | Domenico | 260—294.8 F |
| 3,725,421 | 4/1973 | Domenico | 260—294.8 F |

ALAN L. ROTMAN, Primary Examiner

U.S. Cl. X.R.

260—294.8 G; 424—263